(12) United States Patent
Choi et al.

(10) Patent No.: US 8,903,159 B2
(45) Date of Patent: Dec. 2, 2014

(54) METHOD AND APPARATUS FOR TRACKING IMAGE PATCH CONSIDERING SCALE

(75) Inventors: Ki-wan Choi, Anyang-si (KR); Hyoung-ki Lee, Seongnam-si (KR); Ji-young Park, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1229 days.

(21) Appl. No.: 12/662,528

(22) Filed: Apr. 21, 2010

(65) Prior Publication Data

US 2011/0085699 A1 Apr. 14, 2011

(30) Foreign Application Priority Data

Oct. 9, 2009 (KR) .......................... 10-2009-0096196

(51) Int. Cl.
*G06K 9/00* (2006.01)
*G06T 7/20* (2006.01)

(52) U.S. Cl.
CPC ....... *G06T 7/204* (2013.01); *G06T 2207/10016* (2013.01); *G06T 2207/20012* (2013.01)
USPC .......................................... 382/153; 382/103

(58) Field of Classification Search
None
See application file for complete search history.

(56) References Cited

U.S. PATENT DOCUMENTS

| | | | |
|---|---|---|---|
| 5,828,769 | A | 10/1998 | Burns |
| 6,496,184 | B1 | 12/2002 | Freeman et al. |
| 6,711,293 | B1 * | 3/2004 | Lowe ............................ 382/219 |
| 2005/0135482 | A1 | 6/2005 | Nair et al. |
| 2005/0195278 | A1 | 9/2005 | Nair |
| 2011/0025825 | A1 * | 2/2011 | McNamer et al. .............. 348/46 |
| 2011/0255775 | A1 * | 10/2011 | McNamer et al. ............ 382/154 |

FOREIGN PATENT DOCUMENTS

| | | |
|---|---|---|
| CN | 1333700 | 1/2002 |
| JP | 2001-22942 | 1/2001 |
| KR | 10-2004-0095831 | 11/2004 |
| KR | 10-2005-0065298 | 6/2005 |
| KR | 10-2005-0065348 | 6/2005 |
| WO | WO0031560 A * | 6/2000 |

OTHER PUBLICATIONS

English translation of Chinese Office Action mailed Sep. 2, 2013 in related Chinese Application No. 201010135629.9.

* cited by examiner

*Primary Examiner* — Kim Vu
*Assistant Examiner* — Fred Hu
(74) *Attorney, Agent, or Firm* — Staas & Halsey LLP

(57) ABSTRACT

A method and apparatus for tracking an image considering scale are provided. A registered image patch may be divided into a scale-invariant image patch and a scale-variant image patch according to a predetermined scale invariance index (SII). If a registered image patch within an image is a scale-invariant image patch, the scale-invariant image patch is tracked by adjusting its position, while if the registered image patch is a scale-variant image patch, the scale-invariant image patch is tracked by adjusting its position and scale.

14 Claims, 5 Drawing Sheets

METHOD AND APPARATUS FOR TRACKING IMAGE PATCH CONSIDERING SCALE

CROSS-REFERENCE TO RELATED APPLICATIONS

This application claims priority benefit under 35 U.S.C. §119(a) of Korean Patent Application No. 10-2009-0096196, filed on Oct. 9, 2009, the entire disclosure of which is incorporated herein by reference for all purposes.

BACKGROUND

1. Field

One or more embodiments relates to robot localization using an image.

2. Description of the Related Art

Broadly speaking, robots may be autonomous machines which are able to do tasks on their own. The robots' usefulness can be attributed to their work performance in extreme situations or in areas that are dangerous to humans. In particular, mobile robots that can walk and clean house are becoming increasingly popular.

Such a mobile robot has a variety of functionalities including localization. The mobile robot may localize itself based on images captured from a camera mounted on the mobile robot. Simultaneous localization and mapping (SLAM) is a typical technique used by the mobile robot to keep track of its current location based on images.

SLAM allows the location of a robot to be found based on a positional relation of a feature point between image frames by registering the feature point in an initial image and keeping track of a location on an image corresponding to the registered feature point in subsequent images.

To find the location of a robot, the location of a feature point is desirably tracked between image frames, for example. The feature point is typically tracked by storing an image patch of a certain region around the feature point when the feature point is initially registered, and locating the stored image patch within subsequent frames.

SUMMARY

One or more embodiments relates to a method and apparatus for tracking an image patch considering scale, which are capable of performing more accurate tracking of the image patch and shortening the tracking time.

Accordingly, in one or more embodiments, there is provided an image patch tracker including a scale invariance index (SII) calculating unit calculating an SII based on a pixel value change with respect to a scale change for a registered image patch, and a scale characteristic deciding unit comparing the SII to a threshold and selectively determining the registered image patch to be one of a scale-invariant image patch, when the SII is less than the threshold, and a scale-variant image patch, when the SII is not less than the threshold.

The image patch tracker may further include an image patch tracking unit adjusting a position of the registered image patch to track the registered image patch within a received image when the registered image patch is determined to be the scale-invariant image patch, and adjusting a position and size of the registered image patch to track the registered image patch within a received image when the registered image patch is determined to be the scale-variant image patch.

The SII may be defined as a least mean square of pixel value changes for each of plural scale reference points.

In one or more embodiments there is provided a method of tracking an image patch considering scale, including calculating a scale invariance index (SII) based on a pixel value change with respect to a scale change for a registered image patch, and comparing the SII to a threshold and selectively determining the registered image patch to be one of a scale-invariant image patch, when the SII is less than the threshold, and a scale-variant image patch, when the SII is not less than the threshold.

Calculating the SII may include setting plural scale reference points within the registered image patch, and calculating a mean of squared pixel value change with respect to a scale change for each of the scale reference points and selecting a least one of the calculated results of the calculating of the squared pixel value change as the SII.

The method may further include adjusting a position of the registered image patch to track the registered image patch within a received image when the registered image patch is determined to be the scale-invariant image patch, and adjusting a position and size of the registered image patch to track the registered image patch when the registered image patch is determined to be the scale-variant image patch.

Additional aspects and/or advantages will be set forth in part in the description which follows and, in part, will be apparent from the description, or may be learned by practice of one or more embodiments of the present invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
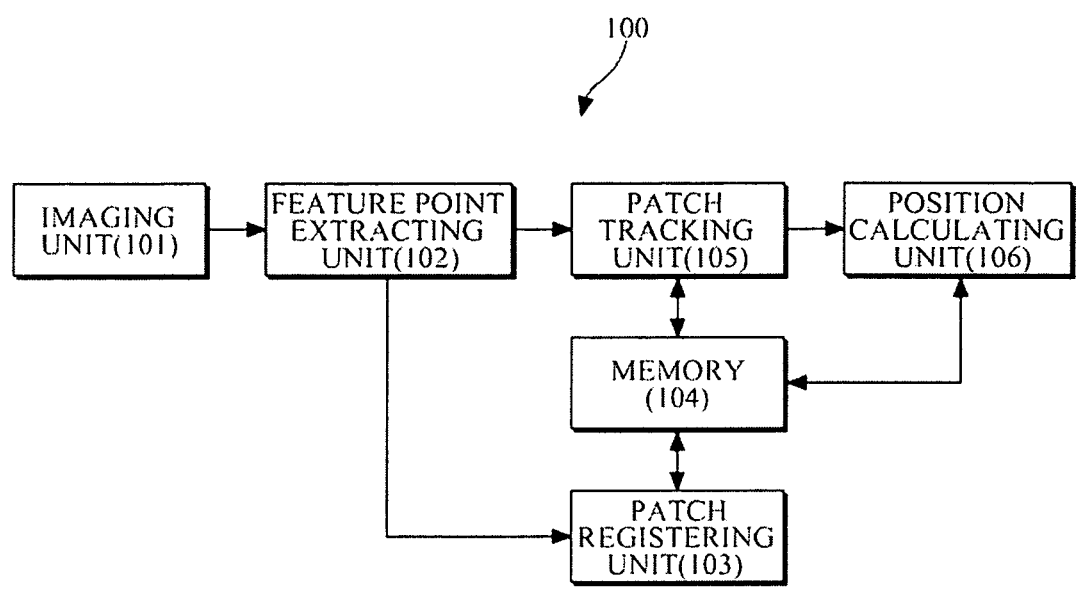
FIG. 1 is a block diagram of a robot localization system, according to one or more embodiments.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 is a block diagram of a robot localization system, according to one or more embodiments.

The robot localization system 100 may include an imaging unit 101, a feature point extracting unit 102, a patch registering unit 103, a memory 104, a patch tracking unit 105, and a position calculating unit 106, for example.

When a robot moves around to perform a specific task, the imaging unit 101 may capture images around the robot at regular intervals. For example, the imaging unit 101 may acquire a forward image by detecting light reflected by a subject ahead and converting the light into a digital signal. For this purpose, the imaging unit 101 may include an image sensor, such as a CCD (charge-coupled device) image sensor or a CMOS (complementary metal-oxide-semiconductor) sensor, and an image processing module to generate a two-dimensional (2D) image from an output received from the image sensor.

The feature point extracting unit 102 extracts a feature point from the image acquired from the imaging unit 101. For example, the feature point extracting unit 102 may use Harris corner detection to extract a corner of an object from an image as a feature point, noting that alternatives are equally available.

The patch registering unit 103 registers an image patch with the memory 104. The image patch may be a portion of an image corresponding to a region around an extracted feature point, for example.

The patch tracking unit 105 tracks a registered image patch within images acquired from the imaging unit 101. For example, when a robot moves around, an image acquired at the robot's previous location may be different from an image acquired at the robot's current location. The patch tracking unit 105 may extract a substantially same image patch as an image patch registered at the previous location, from the image acquired at the current location.

If the registered image patch is found in the image acquired at the current location, the position calculating unit 106 may match feature points between the registered image patch and the extracted image patch to calculate the position of the robot. The position of the robot may be calculated using algorithms, such as extended Kalman filter (EKF)-based or particle-based simultaneous localization and mapping (SLAM), noting that alternative embodiments are equally available.

In an embodiment, when tracking a registered image patch within an image, the patch tracking unit 105 may adjust either only the position of the image patch or both the position and scale of the image patch to scan the image according to a scale characteristic of the registered image patch. The scale characteristic of the image patch may be divided into scale invariance and scale variance.

For example, for a scale-invariant image patch, a parameter with two degrees of freedom (i.e., an x-coordinate variable and a y-coordinate variable) may be used to track the image patch, while for a scale-variant image patch, a parameter with three degrees of freedom (i.e., an x-coordinate variable, a y-coordinate variable, and a scale variable) may be used to track the image patch.

Figure 2:
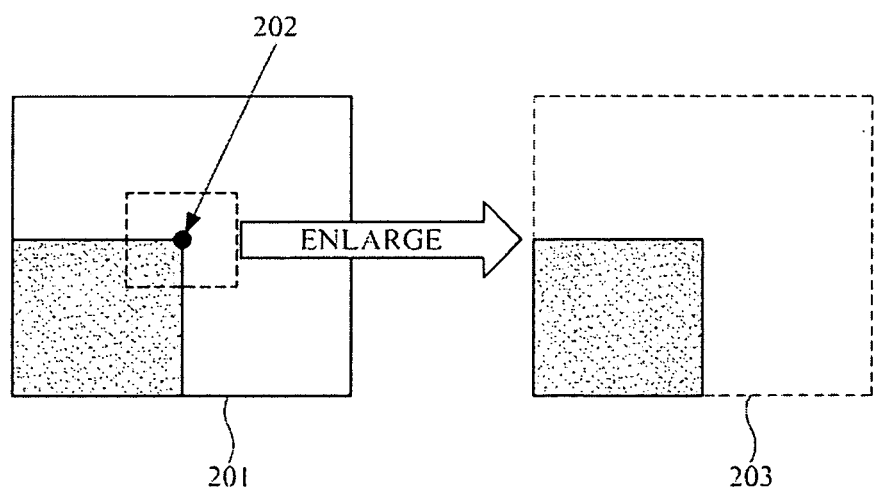
FIG. 2 illustrates a scale-invariant image patch, according to one or more embodiments.

FIG. 2 illustrates a scale-invariant image patch, according to one or more embodiments.

Referring to FIG. 2, the scale-invariant image patch refers to an image patch that remains substantially the same in shape in an image before and after scale-up or scale-down from a scale reference point 202 within an image patch 201. The scale reference point 202 may be defined as a reference point for a scale-up or scale-down. Any point within the image patch 201 may be set as the scale reference point 202.

It can be seen from FIG. 2 that when the image patch 201 is enlarged to an image patch 203 with respect to the scale reference point 202, the enlarged image patch 203 is nearly the same in shape as the original image patch 201. If the scale reference point 202 is set to a different point, the enlarged image patch 203 may be different in shape from the original image patch 201. However, if an image patch is not changed in shape with respect to at least one scale reference point 202, the image patch may be considered to be a scale-invariant image patch.

If a registered image patch is the scale-invariant image patch shown in FIG. 2, the patch tracking unit 105 (see FIG. 1) may track the image patch simply by adjusting the position of the image patch.

Figure 3:
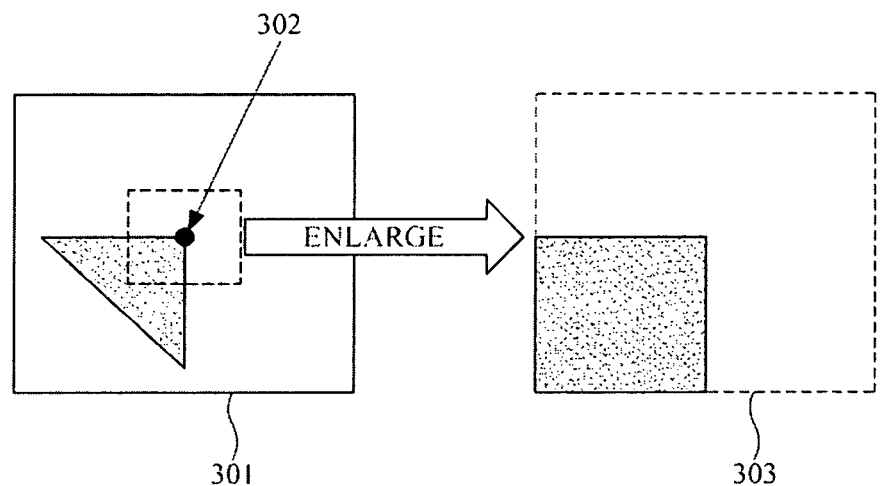
FIG. 3 illustrates a scale-variant image patch, according to one or more embodiments.

FIG. 3 illustrates a scale-variant image patch, according to one or more embodiments.

Referring to FIG. 3, the scale-variant image patch refers to an image patch that changes in image shape before and after scale-up or scale-down from a scale reference point 302 within an image patch 301. The scale reference point 302 may be defined as a reference point for scale-up or scale-down. Any point within the image patch 301 may be set as the scale reference point 302.

It can be seen from FIG. 3 that although the scale reference point 302 is set at any point within the image patch 301, the enlarged image patch 303 is different in shape from the original image patch 301.

If a registered image patch is such a scale-variant image patch, as shown in FIG. 3, the patch tracking unit 105 (see FIG. 1) may track the image patch by adjusting both the position and scale of the image patch.

Figure 4:
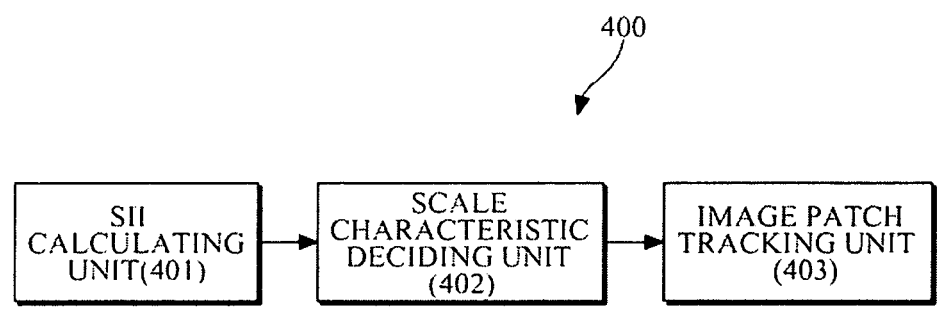
FIG. 4 is a block diagram of an image patch tracker considering scale, according to one or more embodiments.

FIG. 4 is a block diagram of an image patch tracker, according to one or more embodiments.

The image patch tracker 400 may include a scale invariance index (SII) calculating unit 401, a scale characteristic deciding unit 402, and an image patch tracking unit 403, for example.

The SII calculating unit 401 calculates a scale invariance index for a registered image patch. The scale invariance index is associated with a scale characteristic of the registered image patch and indicates an image change with respect to a scale change. The SII may be defined based on a mean of squared intensity change (MSI) in a pixel value of an image patch with respect to a scale change, for example. The MSI may change according to the position of a scale reference point within an image patch. The SII may be the least of MSI values that are calculated with respect to each scale reference point. This will be described in greater detail below.

The scale characteristic deciding unit 402 may decide a scale characteristic of a registered image patch based on the calculated SII. For example, the scale characteristic deciding unit 402 may compare the calculated SII with a predetermined threshold (e.g., about 800-1000) and decide the registered image patch as a scale-invariant image patch or a scale-variant image patch. If the SII is less than the threshold, the registered image patch may be determined to be a scale-invariant image patch as shown in FIG. 2. If the SII is not less than the threshold, the registered image patch may be determined to be a scale-variant image patch as shown in FIG. 3.

The image patch tracking unit 403 may track a registered image patch within a received image based on a scale characteristic of the registered image patch. For example, the image patch tracking unit 403 may locate a registered image patch within an image based on the Lucas-Kanade algorithm, noting that alternatives are also available. Here, if the registered image patch is a scale-invariant image patch, the position of the registered image patch is adjusted to track the registered image patch, whereas if the registered image patch is a scale-variant image patch, the position and size of the registered image patch are adjusted to track the registered image patch.

Figure 5:
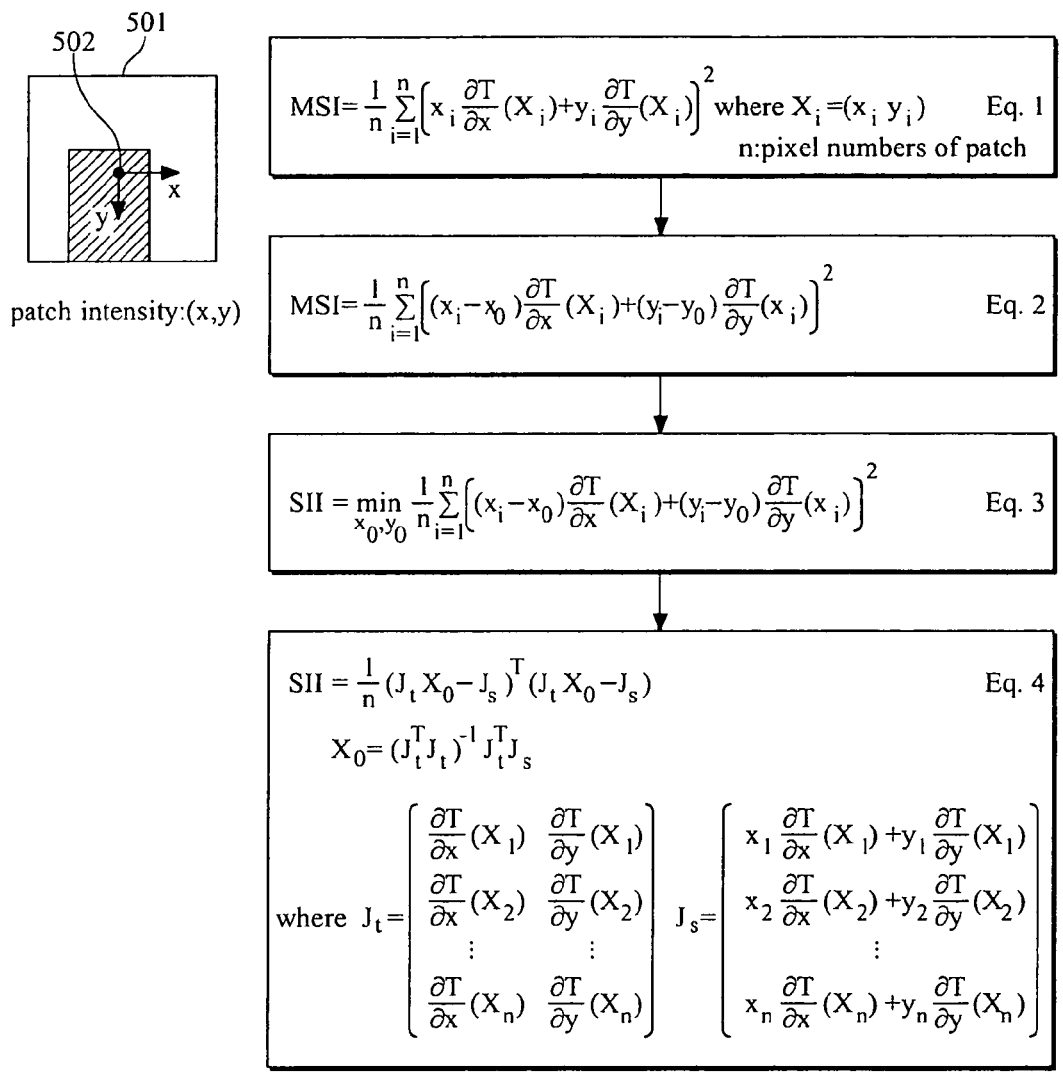
FIG. 5 illustrates a scale invariance index, according to one or more embodiments.

FIG. 5 illustrates a scale invariance index (SII), according to one or more embodiments.

A method of calculating the SII will be described with reference to FIG. 5.

The MSI may be defined according to the below Equation 1, for example.

$$MSI = \frac{1}{n} \sum_{i=1}^{n} \left( x_i \frac{\partial T}{\partial x}(x_i) + y_i \frac{\partial T}{\partial y}(x_i) \right)^2 \quad \text{Equation 1}$$

Here, $x_i = (x_i, y_i)$, and n: pixel numbers of a patch.

In Equation 1, the MSI is defined as a mean of squared intensity change of an image patch 501 with respect to a change in scale. The term intensity may mean each pixel value of the image patch 501.

In Equation 1, the MSI is determined by setting the scale reference point to the center 502 of the image patch 501. However, the MSI may be changed if the scale reference point is set to a different point from the center 502 of the image patch 501.

Accordingly, the MSI may be defined considering the scale reference point according to the below Equation 2, for example.

$$MSI = \frac{1}{n} \sum_{i=1}^{n} \left( (x_i - x_0) \frac{\partial T}{\partial x}(x_i) + (y_i - y_0) \frac{\partial T}{\partial y}(x_i) \right)^2 \quad \text{Equation 2}$$

In Equation 2, the terms $x_0$ and $y_0$ denote scale reference points. That is, in Equation 2, a plurality of MSIs may be calculated according to the scale reference points. In this case, the SII may be defined based on the least of the MSIs, according to the below Equation 3, for example.

$$SII = \min_{x_0, y_0} \frac{1}{n} \sum_{i=1}^{n} \left( (x_i - x_0) \frac{\partial T}{\partial x}(x_i) + (y_i - y_0) \frac{\partial T}{\partial y}(x_i) \right)^2 \quad \text{Equation 3}$$

In Equation 3, the SII may be found using the following linear least square, according to the below Equation 4, for example.

$$SII = \frac{1}{n} (J_t x_0 - J_s)^T (J_t x_0 - J_s) \quad \text{Equation 4}$$

$$x_0 = (J_t^T J_t)^{-1} J_t^T J_s$$

where $$J_t = \begin{bmatrix} \frac{\partial T}{\partial x}(x_1) & \frac{\partial T}{\partial y}(x_1) \\ \frac{\partial T}{\partial x}(x_2) & \frac{\partial T}{\partial y}(x_2) \\ \vdots & \vdots \\ \frac{\partial T}{\partial x}(x_n) & \frac{\partial T}{\partial y}(x_n) \end{bmatrix} \quad J_s = \begin{bmatrix} x_1 \frac{\partial T}{\partial x}(x_1) + y_1 \frac{\partial T}{\partial y}(x_1) \\ x_2 \frac{\partial T}{\partial x}(x_2) + y_2 \frac{\partial T}{\partial y}(x_2) \\ \vdots \\ x_n \frac{\partial T}{\partial x}(x_n) + y_n \frac{\partial T}{\partial y}(x_n) \end{bmatrix}$$

As such, by using SIIs calculated for each of the registered image patches, the characteristic of each of the registered image patches may be determined as being scale-invariant or scale-variant.

Figure 6:
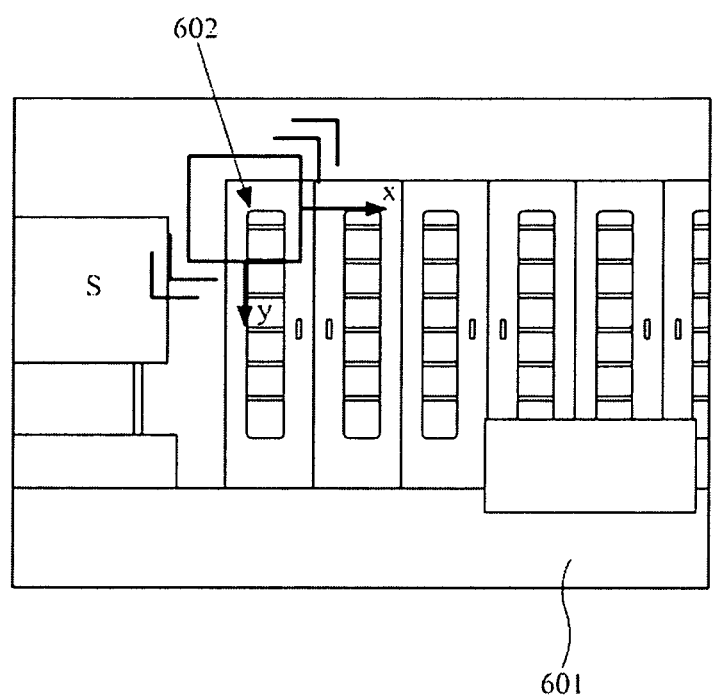
FIG. 6 illustrates an acquired image, according to one or more embodiments.

FIG. 6 illustrates an acquired image, according to one or more embodiments.

After an SII is calculated and a scale characteristic is determined for a registered image patch, the image patch tracking unit 403 tracks a registered image patch 602 within an image 601.

If the registered image patch 602 is a scale-invariant image patch (e.g., if the SII is less than a threshold), the image patch tracking unit 403 sets x and y coordinate variables as a parameter for tracking, and uses the parameter to locate the registered image patch 602 in the image 601. For example, a parameter with two degrees of freedom may be used to track a scale-invariant image patch.

If the registered image patch 602 is a scale-variant image patch (e.g., if the SII is not less than the threshold), the image patch tracking unit 403 sets a scale variable s as well as x and y coordinate variables as a parameter for tracking, and uses the parameters to locate the registered image patch 602 in the image 601. For example, a parameter with three degrees of freedom may be used to track a scale-variant image patch.

Figure 7:
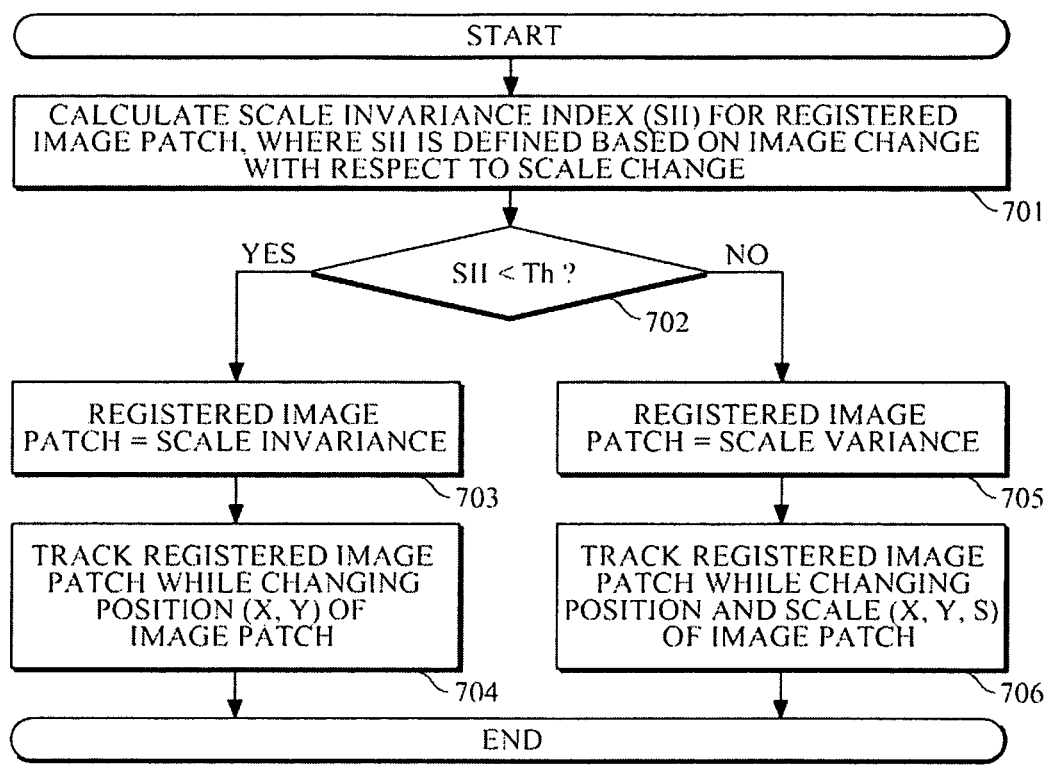
FIG. 7 is a flow chart of a method of tracking an image patch considering scale, according to one or more embodiments.

FIG. 7 is a flow chart of an image patch tracking method, according to one or more embodiments.

Referring to FIGS. 7 and 4, with the reference to FIG. 4 being only an example, in operation 701, the SII calculating unit 401 may calculate an SII for a registered image patch. The SII indicates image change with respect to scale change. In this case, the above-mentioned Equations 1 to 4 and the method of FIG. 5 may be used.

In operation 702, the scale characteristic deciding unit 402 compares the calculated SII with the threshold to determine a scale characteristic of the registered image patch. The threshold may be about 800 to 1000 for an 8 bit gray image.

As a result of the comparison, if the SII is less than the threshold, in operation 703, the scale characteristic deciding unit 402 may determine the registered image patch is a scale-invariant image patch. Thus, in operation 704, the image patch tracking unit 403 tracks the registered image patch while changing the position of the image patch determined as the scale-invariant image patch.

If the SII is not less than the threshold, in operation 705, the scale characteristic deciding unit 402 may determine the registered image patch is a scale-variant image patch. Thus, in operation 706, the image patch tracking unit 403 tracks the registered image patch while changing the position and scale of the image patch determined as the scale-variant image patch.

In addition to the above described embodiments, embodiments can also be implemented through computer readable code/instructions in/on a non-transitory medium, e.g., a computer readable medium, to control at least one processing device to implement any above described embodiment. The medium can correspond to any defined, measurable, and tangible structure permitting the storing and/or transmission of the computer readable code.

The media may also include, e.g., in combination with the computer readable code, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of computer readable code include both machine code, such as produced by a compiler, and files containing higher level code that may be executed by the computer using an interpreter, for example. The media may also be a distributed network, so that the computer readable code is stored and executed in a distributed fashion. Still further, as only an example, the processing element could include a processor or a computer processor, and processing elements may be distributed and/or included in a single device.

As apparent from the above description, since the scale characteristic of the image patch may be determined and the parameter for tracking the image patch may be appropriately set according to the scale characteristic, it is possible to perform more successful and accurate tracking and to shorten operation time.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or are replaced or supplemented by other components or their equivalents. Accordingly, other implementations are within the scope of the following claims.

Further, while aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An image patch tracker, including one or more processing devices, the image patch tracker comprising:
a scale invariance index (SII) calculating unit including at least one of the one or more processing devices to calculate an SII based on a pixel value change with respect to a scale change for a registered image patch; and
a scale characteristic deciding unit including at least one of the one or more processing devices to compare the SII to a threshold and to selectively determine the registered image patch to be one of a scale-invariant image patch, when the SII is less than the threshold, and a scale-variant image patch, when the SII is not less than the threshold.

2. The image patch tracker of claim 1, wherein the pixel value change with respect to the scale change varies depending on respective positions of scale reference points, defined as respective reference points for scale-up or scale-down of the registered image patch, and the SII is defined as a least mean square of the pixel value change for each of the scale reference points.

3. The image patch tracker of claim 2, wherein the SII calculating unit sets at least one of the scale reference points within the registered image patch, calculates a mean of squared pixel value change with respect to the scale change for each of the scale reference points, and selects a least of the calculated results of the calculated mean of squared pixel value change as the SII.

4. The image patch tracker of claim 1, further comprising an image patch tracking unit to adjust a position of the registered image patch to track the registered image patch within a received image when the registered image patch is determined to be the scale-invariant image patch, and adjusting a position and size of the registered image patch to track the registered image patch within a received image when the registered image patch is determined as the scale-variant image patch.

5. A method of tracking an image patch considering scale, comprising:
calculating a scale invariance index (SII) based on a pixel value change with respect to a scale change for a registered image patch; and
comparing the SII to a threshold and selectively determining the registered image patch to be one of a scale-invariant image patch, when the SII is less than the threshold, and a scale-variant image patch, when the SII is not less than the threshold.

6. The method of claim 5, wherein the pixel value change with respect to the scale change varies depending on respective positions of scale reference points, defined as respective reference points for scale-up or scale-down of the registered image patch, and the SII is defined as a least mean square of the pixel value change for each of the scale reference points.

7. The method of claim 6, wherein calculating the SII comprises:
setting at least one of the scale reference points within the registered image patch; and
calculating a mean of squared pixel value change with respect to the scale change for each of the scale reference points and selecting a least of the calculated results of the calculated mean of squared pixel value change as the SII.

8. The method of claim 5, further comprising:
adjusting a position of the registered image patch to track the registered image patch within a received image when the registered image patch is determined to be the scale-invariant image patch; and
adjusting a position and size of the registered image patch to track the registered image patch within a received image when the registered image patch is determined to be the scale-variant image patch.

9. The image patch tracker of claim 1, wherein the SIII calculation unit calculates the SII based on a scale change for a shape of the registered image patch.

10. The image patch tracker of claim 9, further comprising an image patch tracking unit to adjust a position and shape of the registered image patch to track the registered image patch within a received image when the registered image patch is determined as the scale-variant image patch.

11. The image patch tracker of claim 1, further comprising an image patch tracking unit to adjust a position and shape of the registered image patch to track the registered image patch within a received image when the registered image patch is determined as the scale-variant image patch.

12. The method of claim 5, further comprising calculating the SII based on a scale change for a shape of the registered image patch.

13. The method of claim 12, further comprising an image patch tracking unit to adjust a position and shape of the registered image patch to track the registered image patch within a received image when the registered image patch is determined as the scale-variant image patch.

14. The method of claim 5, further comprising an image patch tracking unit to adjust a position and shape of the registered image patch to track the registered image patch within a received image when the registered image patch is determined as the scale-variant image patch.

* * * * *